United States Patent Office 3,470,269
Patented Sept. 30, 1969

3,470,269
RESIN COMPOSITIONS CONTAINING POST-CHLO-
RINATED POLYVINYL CHLORIDE
Yvan Dobovsek, Versailles, France, assignor to Solvay &
Cie, Brussels, Belgium, a corporation of Belgium
No Drawing. Continuation-in-part of application Ser. No.
396,574, Sept. 15, 1964. This application May 25, 1967,
Ser. No. 641,154
Claims priority, application France, Sept. 20, 1964,
948,109, Patent 1,378,939
Int. Cl. C08f 29/24
U.S. Cl. 260—897                                    6 Claims

ABSTRACT OF THE DISCLOSURE

Resin compositions containing post-chlorinated polyvinyl chloride, polyvinyl chloride and chlorinated polyethylene and shaped articles constituted of these compositions.

BACKGROUND OF THE INVENTION

This application is a continuation-in-part of U.S. application Ser. No. 396,574 filed Sept. 15, 1964 now abandoned.

This invention relates to resin compositions consisting essentially of a mixture of post-chlorinated polyvinyl chloride, polyvinyl chloride and chlorinated polyethylene and to shaped articles constituted of these compositions.

It is well known that chlorinated polyvinyl chloride is more resistant to the effects of temperature than polyvinyl chloride and this advantage is the more marked, the higher the content of chlorine.

Because of its increased softening temperature, the application of post-chlorinated polyvinylchloride, also known in the art and referred to herein as "chlorinated polyvinyl chloride," requires temperatures which are the higher, the greater the chlorine content. In application, however, it is practically impossible to exceed 200° C. without risking substantial or even total decomposition of the polymer. It is, therefore, necessary to add to the chlorinated polyvinyl chloride a compound capable of substantially reducing its gelling temperature in order to permit its employment at a temperature below decomposition point and at which the polymer has a sufficient thermal stability.

These compounds which are hereinafter called "fluxing agents," include customary plasticizers for polyvinyl chloride. These have, however, the serious disadvantage that they considerably reduce the thermal stability of chlorinated polyvinyl chloride.

Also, shaped products constituted of resin compositions based on chlorinated polyvinyl chloride do not have sufficient resistance to impact or shock for certain applications.

SUMMARY OF THE INVENTION

According to the invention, it has been found that by adding to post-chlorinated polyvinyl chloride, polyvinyl chloride as a fluxing agent and chlorinated polyethylene as an agent to improve impact-resistance, there is obtained a unique combination of properties whereby the resultant resin composition is particularly readily extruded into shaped articles and shaped articles constituted of the resin composition have both a high heat-distortion temperature and a particularly excellent resistance to impact or shock.

DESCRIPTION OF THE PREFERRED EMBODIMENTS

It is found that the unique combination of particularly easy extrudability of the resin composition and high heat-distortion temperature and particularly excellent impact-resistance of shaped articles made from the resin composition is best obtained by employing the essential components in the following range of proportions, by weight: 65 to 89% chlorinated polyvinyl chloride, 1 to 30% polyvinyl chloride and 5 to 10% chlorinated polyethylene.

Though chlorinated polyethylenes in general may be employed in the invention, particularly good results are attained when the chlorine content, by weight, of the chlorinated polyethylene is in the range of 25 to 50%.

Polyvinyl chlorides of all types are suitable for use in the present invention. Preferably, generally 5 to 20% of the polyvinyl chloride is employed. Similarly, chlorinated polyvinyl chlorides of all types are suitable. However, particularly desirable results are obtained by using chlorinated polyvinyl chlorides in which the chlorine content is in the range of 620 to 690 grams of chlorine per kilogram of the polymer.

Minor amounts of conventional resin composition components such as pigments may be incorporated in the resin compositions of the present invention.

The resin compositions of the invention may be fabricated into shaped articles by any conventional technique for fabricating thermoplastics into shaped articles, such as by extrusion and by molding.

A particularly important aspect of the present invention is that the resin compositions of the invention are particularly suited for extrusion into pipes or other conduits for carrying hot liquids, particularly hot water. Thus, pipes constituted of the resin compositions of the invention may be employed for central heating installations, which application hithertofore has been generally limited to metal pipe.

Pipes for central heating systems must be able to withstand a temperature close to 100° C. without distortion. Moreover, pipes for plumbing, such as central heating systems, are handled roughly and, accordingly, such pipes must have excellent resistance to impact. This combination of properties is found in pipe made of the resin compositions according to the invention. Moreover, the resin compositions are even further particularly suited for this application, because they extrude particularly readily.

The invention will now be further illustrated by reference to the following examples which are not intended, however, to limit the scope of the invention. Examples according to the invention are designated by a numeral alone whereas examples for the purpose of comparison are designated R followed by a numeral.

For the tests conducted, specimens are fabricated by means of an extruder. The polyvinyl chloride used has a Fikentscher K-value of 66. The tests set forth in Table 1, below, illustrate the remarkable effect of the simultaneous presence of chlorinated polyethylene and polyvinyl chloride with the chlorinated polyvinyl chloride, as compared to chlorinated polyethylene alone with the chlorinated polyvinyl chloride, upon the extrusion rate. The extrusion temperature in Example R1 and Example 2 is from 150 to 190° C.

TABLE 1

| | Composition of mixture (percent by weight) | | | |
| --- | --- | --- | --- | --- |
| Ex. | Chlorinated polyvinyl chloride (665–680 g. Cl/kg.) | Chlorinated polyethylene (38 wt. percent Cl) | Polyvinyl chloride | Feed to extruder, kg./hr. |
| R1 | 90 | 10 | 0 | 3–4 |
| 2 | 80 | 10 | 10 | 7.9 |

Another measurement of extrudability is Macklow-Smith low pressure. Lower flow pressure, of course, indicates greater ease of extrusion. The examples in Table 2, below, further indicate the improvement in extrudability effected by the present invention.

TABLE 2

| Ex. | Composition of mixture (percent by weight) | | | Macklow-Smith flow pressure at 190°C. (kg./cm.²) |
|---|---|---|---|---|
| | Chlorinated polyvinyl chloride (665–680 g. of Cl per kg.) | Polyvinyl chloride | Chlorinated polyethylene (38% by weight of chlorine) | |
| R3 | 90 | 10 | 0 | 213 |
| R4 | 80 | 20 | 0 | 188 |
| R5 | 70 | 30 | 0 | 160 |
| R2 | 90 | 0 | 10 | 261 |
| R6 | 97 | 0 | 3 | 280 |
| 7 | 73 | 17 | 10 | 125 |
| 8 | 67 | 26.5 | 6.5 | 139 |

Even more notable is the improvement in impact resistance effected by the present invention, as illustrated in Table 3, below.

TABLE 3

| Example: | Resistance to impact (kg.-meter) |
|---|---|
| R3 | 0.056 |
| R4 | 0.068 |
| R5 | 0.250 |
| R2 | 0.5 |
| R6 | 0.15 |
| 7 | 4 |
| 8 | 2.6 |

The "resistance to impact" value is determined by the following method:

The test specimens are 200 mm. lengths of pipe having an outer diameter of 25 mm. and an inner diameter of 21 mm. The specimen is allowed to rest along its entire length in the hollow of a V-shaped support, and it is subjected at its middle to the impact of a mass (weight) falling from a predetermined height. The height through which the mass is allowed to fall is fixed at ½ meter, 1 meter or 2 meters respectively and the mass is decreased or increased by fixed amounts depending on whether or not the specimen breaks during the test. The "resistance to impact" values in examples is the product of the height through which the mass is allowed to fall and the size of the mass for which 50% of a number of specimens are broken.

The excellent mechanical properties of shaped articles constituted of compositions according to the invention are further illustrated in Table 4, below. Example 9 is a mixture of 85% chlorinated polyvinyl chloride, 6.7% polyvinyl chloride and 8.3% chlorinated polyethylene, all by weight, and Example 10 is a mixture of 73% chlorinated polyvinyl chloride, 18% polyvinyl chloride and 9% chlorinated polyethylene, all by weight; the chlorine contents of the chlorinated polyvinyl chloride and of the chlorinated polyethylene are the same as for the other examples.

TABLE 4

| Example | 7 | 8 | 9 | 10 |
|---|---|---|---|---|
| Tensile strength[1] (5.6 mm./min.): | | | | |
| Breaking load or stress, kg./cm.² | 448 | 500 | 565 | 523 |
| Elongation at rupture, percent | 74 | 118 | 46 | 50 |
| Tensile impact [2] (kg./cm./cm.²) | 413 | 500 | 324 | 447 |

[1] According to ASTM D 638, ASTM 412 standard, C type test piece.
[2] According to DIN 53 448 standard, unnotched test-piece.

Moreover, the foregoing improvements are not obtained at the sacrifice of high heat distortion temperature, as illustrated in Table 5, below.

TABLE 5

| Example: | Heat distortion temperature, °C. |
|---|---|
| R3 | 115 |
| R4 | 110 |
| R5 | 98 |
| R2 | 105 |
| R6 | 104 |
| 7 | 103 |
| 8 | 101 |

Furthermore, pipe of the compositions of the invention can have a remarkably high bursting period, as determined by the DIN 8061 standard. For example, pipe of the composition of Example 8 has an average bursting period at 80° C. according to the DIN 8061 standard of 7,000 hours for a value of $\sigma$ of 50 and 40,000 hours for a value of $\sigma$ of 40.

The particular embodiments by reference to which the invention is hereabove described are intended to illustrate the invention but not to limit the scope of the invention.

What I claim and desire to secure by Letters Patent is:

1. A resin composition consisting essentially of a mixture, by weight, of 65 to 89% post-chlorinated polyvinyl chloride, 1 to 30% polyvinyl chloride and 5 to 10% chlorinated polyethylene.

2. A resin composition according to claim 1, in which the weight proportion of the mixture constituted of the polyvinyl chloride is 5 to 20%.

3. A resin composition according to claim 1, in which the post-chlorinated polyvinyl chloride has a chlorine content of 620 to 690 grams of chlorine per kilogram of the post-chlorinated polyvinyl chloride.

4. A shaped article constituted of a resin composition consisting essentially of a mixture, by weight, of 65 to 89% post-chlorinated polyvinyl chloride, 1 to 30% polyvinyl chloride and 5 to 10% chlorinated polyethylene.

5. A shaped article according to claim 4, in which the weight proportion of the mixture constituted of the polyvinyl chloride is 5 to 20%.

6. A shaped article according to claim 4, in which the post-chlorinated polyvinyl chloride has a chlorine content of 620 to 690 grams of chlorine per kilogram of the post-chlorinated polyvinyl chloride.

References Cited

UNITED STATES PATENTS 3,341,628  9/1967  Buning et al. _____ 260—899
3,006,889  10/1961  Frey _____ 260—45.5

MURRAY TILLMAN, Primary Examiner

C. SECCURO, Assistant Examiner

U.S. Cl. X.R.

260—899